United States Patent
Kuriyagawa et al.

(10) Patent No.: US 10,442,461 B2
(45) Date of Patent: Oct. 15, 2019

(54) POWER EQUIPMENT PROVIDED WITH CENTER PIVOT AXLE

(71) Applicant: HONDA MOTOR CO. LTD., Tokyo (JP)

(72) Inventors: Koji Kuriyagawa, Wako (JP); Hajime Yoshimura, Wako (JP); Norikazu Shimizu, Wako (JP); Shota Tanabe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 119 days.

(21) Appl. No.: 15/801,587

(22) Filed: Nov. 2, 2017

(65) Prior Publication Data
US 2018/0148089 A1 May 31, 2018

(30) Foreign Application Priority Data
Nov. 25, 2016 (JP) .................... 2016-228667

(51) Int. Cl.
| | |
|---|---|
| B62D 11/00 | (2006.01) |
| A01D 69/02 | (2006.01) |
| B60K 7/00 | (2006.01) |
| B60G 9/02 | (2006.01) |
| B60G 17/016 | (2006.01) |
| B60G 17/0165 | (2006.01) |

(52) U.S. Cl.
CPC ........... *B62D 11/003* (2013.01); *A01D 69/02* (2013.01); *B60G 9/02* (2013.01); *B60G 17/0161* (2013.01); *B60G 17/0165* (2013.01); *B60K 7/0007* (2013.01); *B60G 2200/322* (2013.01); *B60G 2300/084* (2013.01); *B60G 2300/50* (2013.01); *B60G 2400/0511* (2013.01); *B60G 2400/204* (2013.01); *B60G 2400/208* (2013.01); *B60G 2400/34* (2013.01); *B60G 2400/412* (2013.01); *B60L 2240/12* (2013.01); *B60L 2240/421* (2013.01); *B60L 2240/463* (2013.01); *B60L 2250/28* (2013.01)

(58) Field of Classification Search
CPC ........... B60G 2800/16; B60G 17/0163; B60D 11/001
USPC ........................................................... 180/6.5
See application file for complete search history.

(56) References Cited

U.S. PATENT DOCUMENTS

| | | | | |
|---|---|---|---|---|
| 6,684,140 | B2 * | 1/2004 | Lu ........................ | B60G 17/016 701/37 |
| 10,207,557 | B2 * | 2/2019 | Bjorn ..................... | A01D 34/81 |
| 10,252,624 | B2 * | 4/2019 | Kelleter ................ | B60L 15/007 |

FOREIGN PATENT DOCUMENTS

JP 2013-001229 1/2013

* cited by examiner

*Primary Examiner* — Joseph M Rocca
*Assistant Examiner* — Harold Eric Pahlck, III
(74) *Attorney, Agent, or Firm* — Rankin, Hill & Clark LLP

(57) ABSTRACT

Power equipment such as a riding mower 2 is provided with a center pivot axle 16 for non-driven wheels 9 thereof and a rigid axle 14 for driven wheels 8. A control unit 1 of the power equipment is configured to accelerate the left driven wheel when a right end up roll angle of the center pivot axle is detected by an axle sensor 25, and to accelerate the right driven wheel when a left end up roll angle of the center pivot axle is detected by the axle sensor when substantially no steering input of a steering device 22 is detected by a steering sensor 24 so that the power equipment may maintain a straight course.

5 Claims, 7 Drawing Sheets

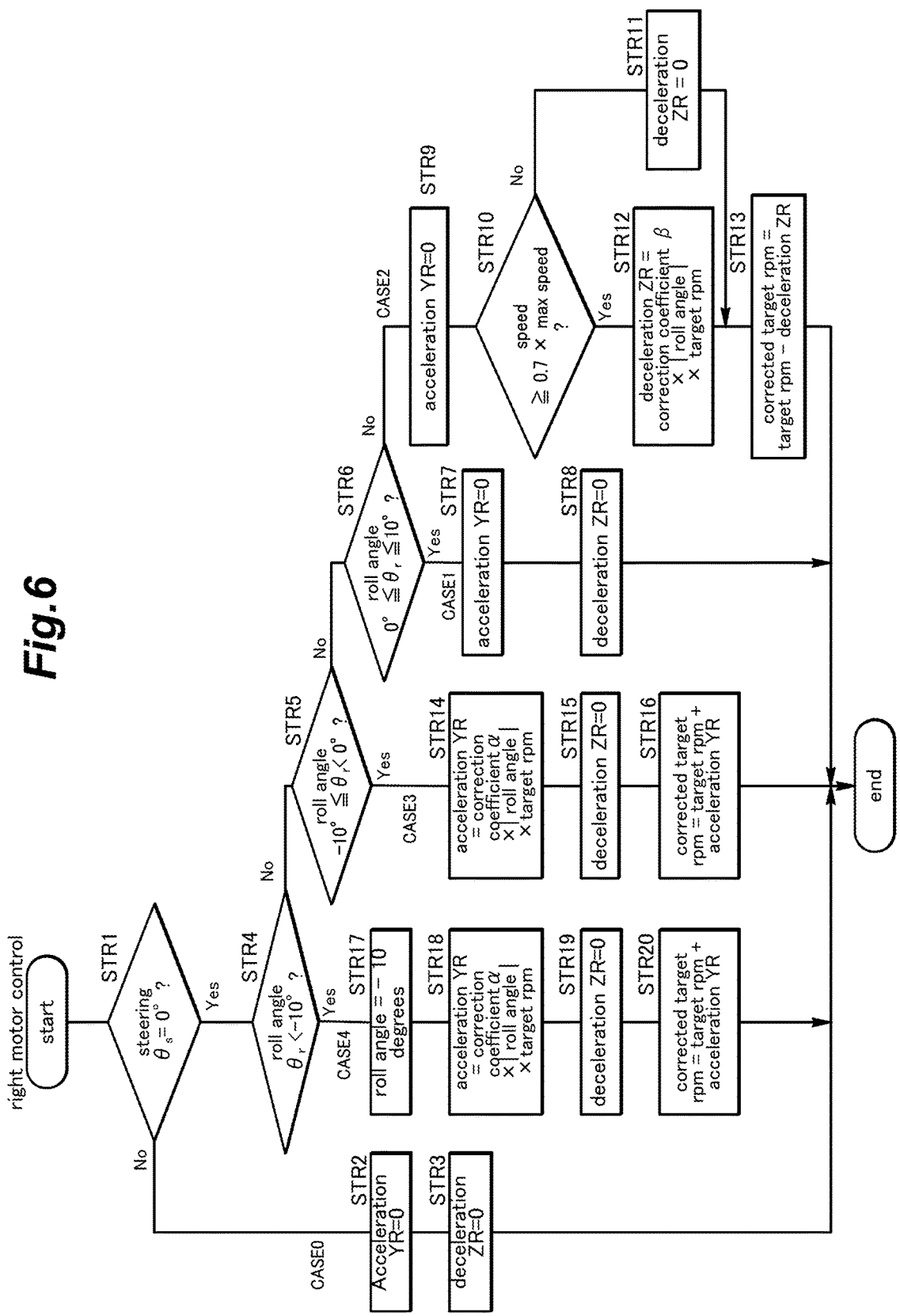

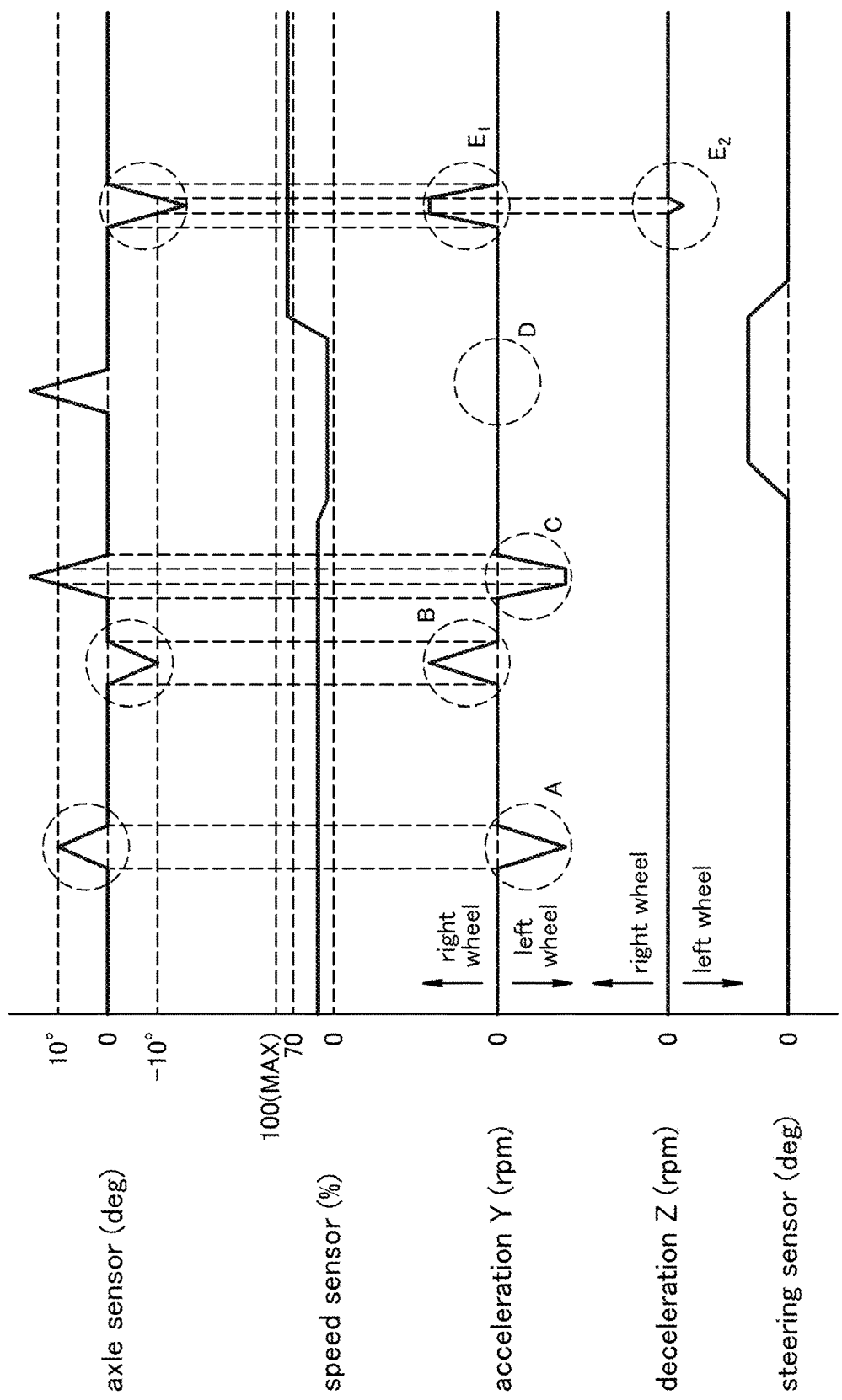

POWER EQUIPMENT PROVIDED WITH CENTER PIVOT AXLE

TECHNICAL FIELD

The present invention relates to power equipment, and in particular to power equipment such as a riding mower which is resistant to swerving even when traveling on an irregular ground surface.

BACKGROUND ART

Riding power equipment such as a riding mower and a riding grass cutter typically travels a straight course from one end of an area to be worked to another, and covers the entire area by laterally shifting the straight course every time the power equipment reaches either end of the area to be worked. If the power equipment swerves from the straight course, an area that is not worked is created. This can be avoided by reducing the amount of the lateral shift and increasing an overlapping area between adjoining courses. However, this reduces the work efficiency because a larger number of passes are required to cover the entire area. It is therefore important to prevent the riding power equipment from swerving or to ensure a favorable straight traveling performance of the riding power equipment in view of improving work efficiency.

JP2013-1229A discloses an arrangement for allowing a vehicle to continue to travel straight ahead without requiring a steering input by a vehicle operator. When a vehicle traverses a slope an angle to the slope, the vehicle tends to turn in a down slope direction even when the steering wheel is kept in the neutral position owing to the force acting on the wheels in the down slope direction. According to this prior art, the traction torque of the driven wheels are adjusted in dependence on the sloping angle of the vehicle so that the vehicle may be steered as intended by the vehicle operator.

A passenger vehicle is often equipped with an independent suspension system in view of maximizing riding comfort. However, in the case of riding power equipment such as a riding mower, a rigid axle suspension system is most commonly used because of high robustness and low cost. If the axle is rigidly attached to the vehicle body, one of the wheels may be lifted from the ground when traveling on an irregular ground surface. To overcome this problem, the axle of the rear wheels or the front wheels may be pivotally supported by the vehicle body at a central point thereof This system is referred to as "center pivot system" in the following disclosure.

According to the center pivot system, when one of the wheels rides over a bump or drops into a dip, the center pivot axle tilts in a corresponding manner. Therefore, the camber angles of the wheels are changed so that the vehicle is steered in the corresponding direction. More specifically, in the case where the front axle is supported by the vehicle body via a center pivot while the rear axle is rigidly supported by the vehicle body, if the left front wheel rides over a bump, the left end of the front axle is lifted with the result that a positive camber is produced in the right front wheel (the right front wheel tilts rightward). This causes the vehicle to be steered to the right. Therefore, the vehicle operator is required to steer to the left in order to keep the vehicle to travel straight ahead. This requires a constant attention of the operator, and impairs the comfort of the operator.

SUMMARY OF THE INVENTION

In view of such a problem of the prior art, a primary object of the present invention is to provide power equipment provided with a center pivot axle which can continue to travel straight ahead even when one of the wheels rides over a bump or drops into a dip without requiring an operator to take a compensatory steering operation.

To achieve such an object, the present invention provides power equipment, comprising: a vehicle body (3); a first axle (14) rigidly supported by the vehicle body and rotatably supporting a pair of driven wheels (8); a power source (12) for individually driving the driven wheels; a second axle (15) supported by the vehicle body via a center pivot (19) and rotatably supporting a pair of non-driven wheels (9); a steering device (22) for steering the non-driven wheels and/or the driven wheels; a steering sensor (24) for detecting a steering input of the steering device; an axle sensor (25) for detecting a roll angle of the second axle relative to the vehicle body; and a control unit (1) for controlling rotational speeds of the driven wheels; wherein the control unit is configured, when substantially no steering input of the steering device is detected by the steering sensor, to accelerate the left driven wheel when a right end up roll angle of the second axle is detected by the axle sensor, and to accelerate the right driven wheel when a left end up roll angle of the second axle is detected by the axle sensor.

Thus, even when the camber angles of the non-driven wheel are changed owing to irregularities of the ground surface, the steering tendency created by the change in the camber angles can be compensated by the acceleration of the corresponding one of the driven wheels so that the power equipment can maintain a straight course with requiring an intervention from an operator.

Preferably, the control unit is configured to accelerate one of the driven wheels by changing a target rotational speed of the one driven wheel and performing a feedback control to cause the one driven wheel to rotate at the target rotational speed. Thereby, a favorable operation of the control unit can be ensured.

The acceleration of one of the driven wheels may be performed in a continuous manner with an increase in the roll angle, or in an incremental manner every time the roll angle has exceeded one of a plurality of threshold values. Typically, the first axle is a rear axle, and the second axle is a front axle.

Preferably, the control unit is configured to accelerate one of the driven wheels by an acceleration value which increases in proportion to an absolute value of the corresponding roll angle when the absolute value of the corresponding roll angle is equal to or smaller than a prescribed value, and is kept fixed at a value when the absolute value of the corresponding roll angle is equal to the prescribed value when the absolute value of the corresponding roll angle is greater than the prescribed value.

Thereby, when the roll angle of the first axle is significantly great (greater than the prescribed value), the compensatory action of the control unit is limited so that an excessive acceleration of the corresponding driven wheel can be avoided.

Preferably, the control unit is further provided with a speed sensor for detecting a travel speed of the power equipment, and is configured to, in addition to accelerating one of the driven wheels, decelerate the other driven wheel when the travel speed of the power equipment detected by the speed sensor exceeds a prescribed value.

Thereby, when the power equipment is traveling at a relatively high speed, by accelerating one of the driven wheels and decelerating the other driven wheel, a straight course can be maintained without increasing an overall acceleration of the power equipment so that the power equipment can be operated without causing any undue stress to the operator.

BRIEF DESCRIPTION OF THE DRAWINGS

FIG. 6 is a flowchart of a control process for a right rear wheel; and

FIG. 7 is a time chart of a control process performed by the control unit.

DESCRIPTION OF THE PREFERRED EMBODIMENT(S)

Figure 1:
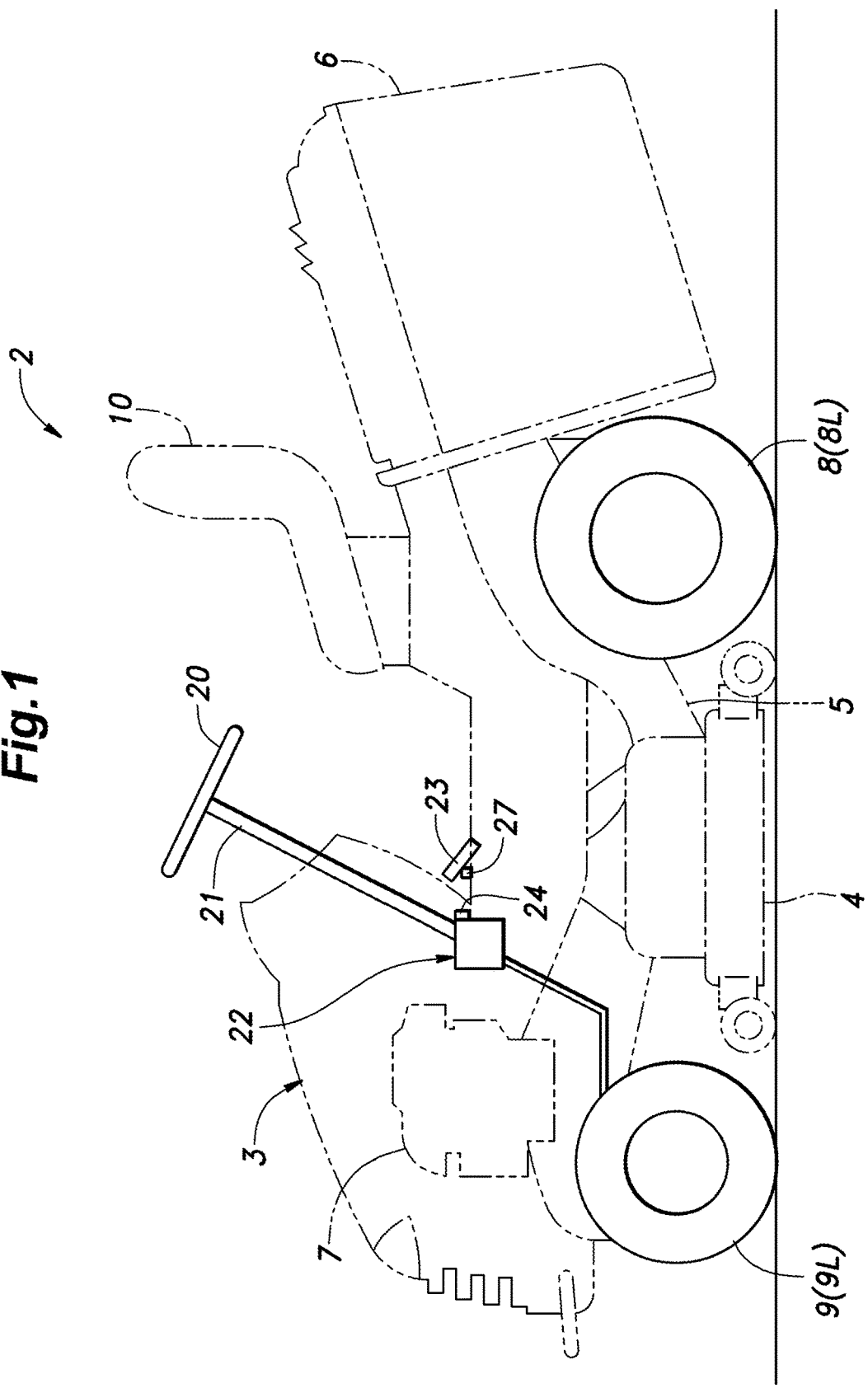
FIG. 1 is a schematic side view of a riding mower according to an embodiment of the present invention.
Figure 2:
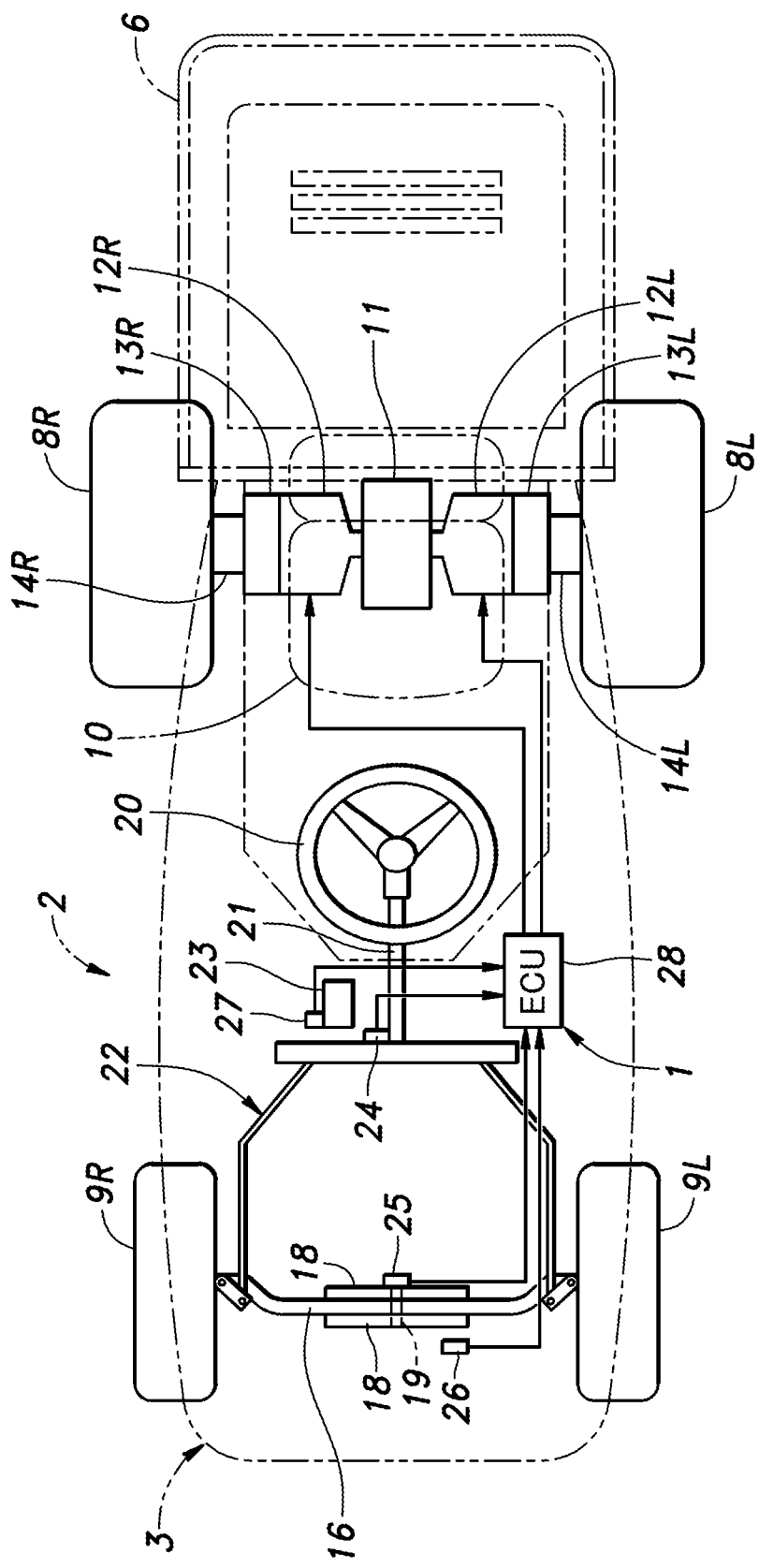
FIG. 2 is a schematic plan view of the riding mower.
Figure 3:
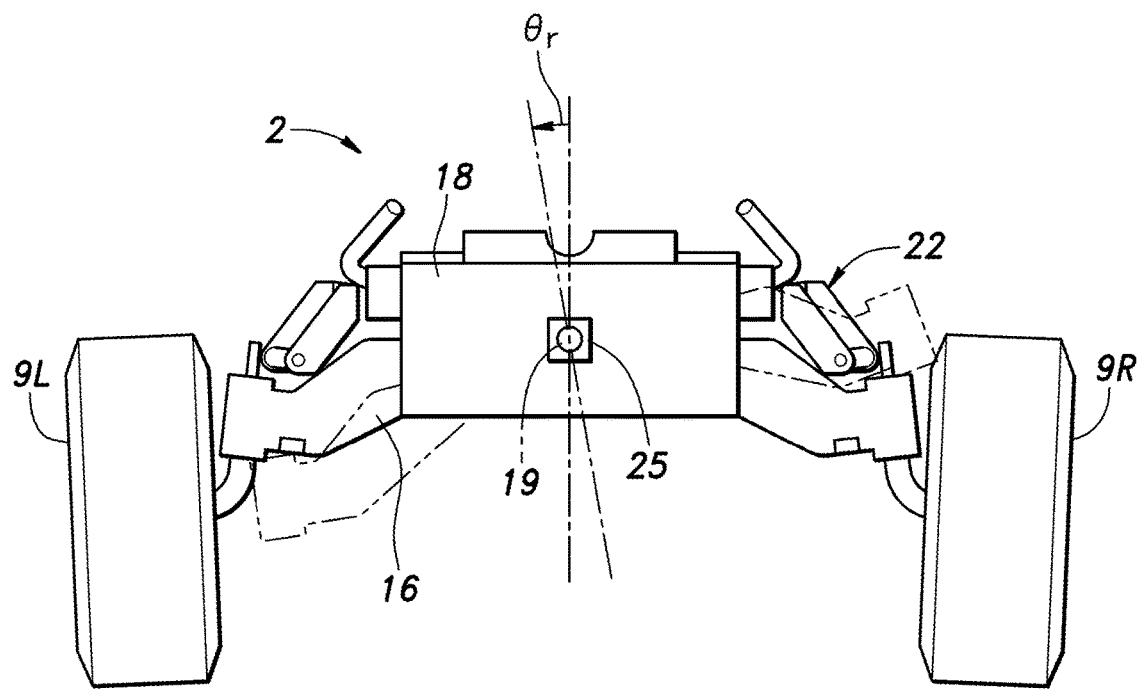
FIG. 3 is a fragmentary rear view of a front axle of the riding mower.

A riding mower 2 according to an embodiment of the present invention is described in the following with reference to FIGS. 1 to 3. The riding mower 2 is generally symmetric about a vertically plane passing centrally through the riding mower 2 in the fore and aft direction. The components on the left and right hand sides are indicated by suffixes L and R, respectively, accompanying the corresponding numerals denoting the components, and these suffixes are omitted when such parts are collectively referred to.

The riding mower 2 is provided with a vehicle body 3 supporting a mowing unit 4 in a lower part thereof The mowing unit 4 includes an engine 7, and a cutting blade (not shown in the drawings) driven by the engine 7. A grass bag 6 is attached to a rear end of the vehicle body 3 so that the grass cut by the cutting blade is forwarded to the grass bag 6 by an air flow created by the rotation of the cutting blade.

The riding mower 2 is provided with a pair of rear wheels 8 and a pair of front wheels 9. The riding mower 2 is further provided with a pair of electric motors 12 having output shafts connected to the respective rear wheels 8 via respective speed reduction units 13. The electric motors 12 and the speed reduction units 13 are coaxially aligned with the rear wheels 8. A battery 11 is positioned centrally between the electric motors 12. The engine 7 is provided with an electric generator not shown in the drawing. The electric power generated by the generator is stored in the battery 11, and the electric motors 12 receive electric power from the battery and the electric power generator under control of a control unit 1 mounted on a central part of the vehicle body 3.

The rear wheels 8, the electric motors 12 and the speed reduction units 13 are rotatably supported by a rear axle 14 which is in turn rigidly supported by the vehicle body 3.

The front wheels 9 are rotatably supported at either lateral end of a front axle 16 which is in turn supported by the vehicle body 3 via a center pivot 19 having a pivot center extending in the fore and aft direction. In the illustrated embodiment, a pair of plate members 18 depend from the vehicle body 3, and interpose a central part of the front axle 16 therebetween. The center pivot 19 is passed through the plate members 18 and the central part of the front axle 16. Owing to this pivot center system, when one of the rear wheels 8 or one of the front wheels 9 rides over a bump or drops into a dip, the front axle 16 tilts in a corresponding direction around the center pivot 19.

The vehicle body 3 is provided with a steering system that includes a steering wheel 20 provided in front of an operator's seat 10, a steering shaft 21 extending centrally from the steering wheel 20 in a forward and downward direction, and a steering mechanism 22 connected to the lower end of the steering shaft 21. The steering mechanism 22 is configured to steer the front wheels 9 according to the steering input supplied thereto via the steering shaft 21 in a per se known manner. Other forms of steering systems such as those using levers may also be used. The vehicle body 3 is further provided with an accelerator pedal 23 for adjusting the output of the electric motors 12 supplied to the rear wheels and a brake pedal (not shown in the drawings) for applying braking force to the front and rear wheels. The vehicle body 3 is provided with levers (not shown in the drawings) for controlling the operation of the mowing unit 4 and adjusting the cutting height.

The control unit 1 is connected to a steering sensor 24 provided on the steering shaft 21 to detect a steering angle $\theta s$ effected by the operator, an axle sensor 25 provided in association with the center pivot 19 for detecting a roll angle $\theta r$ of the front axle 16 relative to the vehicle body 3, a vehicle speed sensor 26 for detecting a travel speed of the mower 2, and an accelerator pedal sensor 27 for detecting a depression stroke of the accelerator pedal 23. The control unit 1 further includes an ECU 28 programmed to control the output of the electric motors 12 according to the signals from these sensors 24 to 27.

Figure 4:
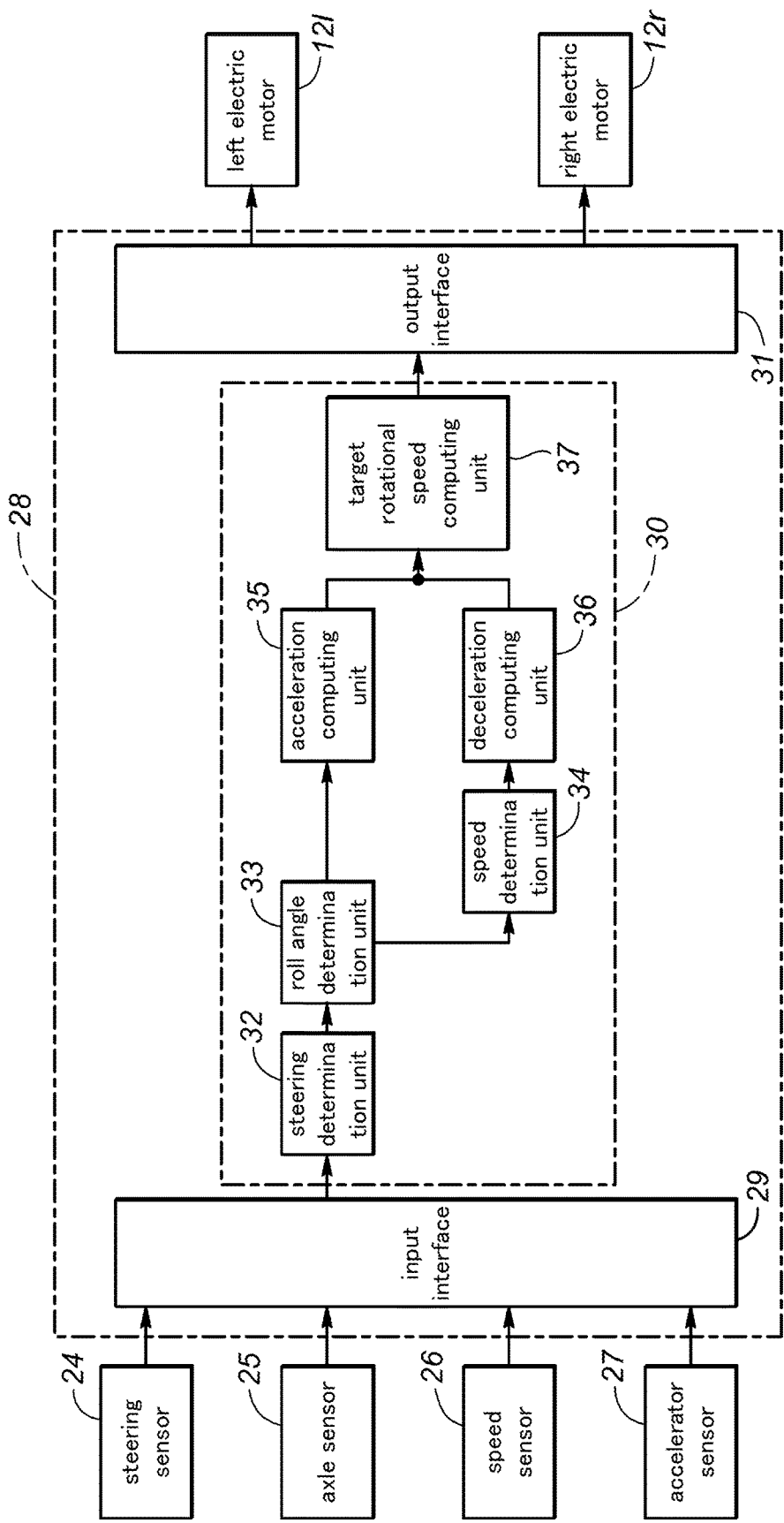
FIG. 4 is a block diagram of a control unit of the riding mower.

The ECU 28 includes a microcomputer, ROM, RAM, peripheral circuits and various drivers, and is connected to the sensors 24 to 27 and the electric motors 12 as shown in FIG. 4. The ECU 28 includes an input interface 29 for receiving data from the sensors 24 to 27, an output correction unit 30 for correcting a command output to the electric motors 12 according to the data received from the input interface 29, and an output interface 31 for transmitting the corrected command output from the output correction unit 30 to the electric motors 12.

As shown in FIG. 4, the output correction unit 30 includes a steering determination unit 32 for determining a steering action of the mower 2 from the output of the steering sensor 24, a roll angle determination unit 33 for determining a roll angle of the mower 2 from the output of the axle sensor 25, a speed determination unit 34 for determining the travel speed of the mower 2 from the output of the vehicle speed sensor 26, an acceleration computing unit 35 for computing an acceleration of the mower 2 according to a prescribed algorithm, a deceleration computing unit 36 for computing a deceleration of the mower 2 according to a prescribed algorithm, and a target rotational speed computing unit 37 for computing a target travel speed of the mower 2 from the output of the accelerator pedal sensor 27.

Figure 5:
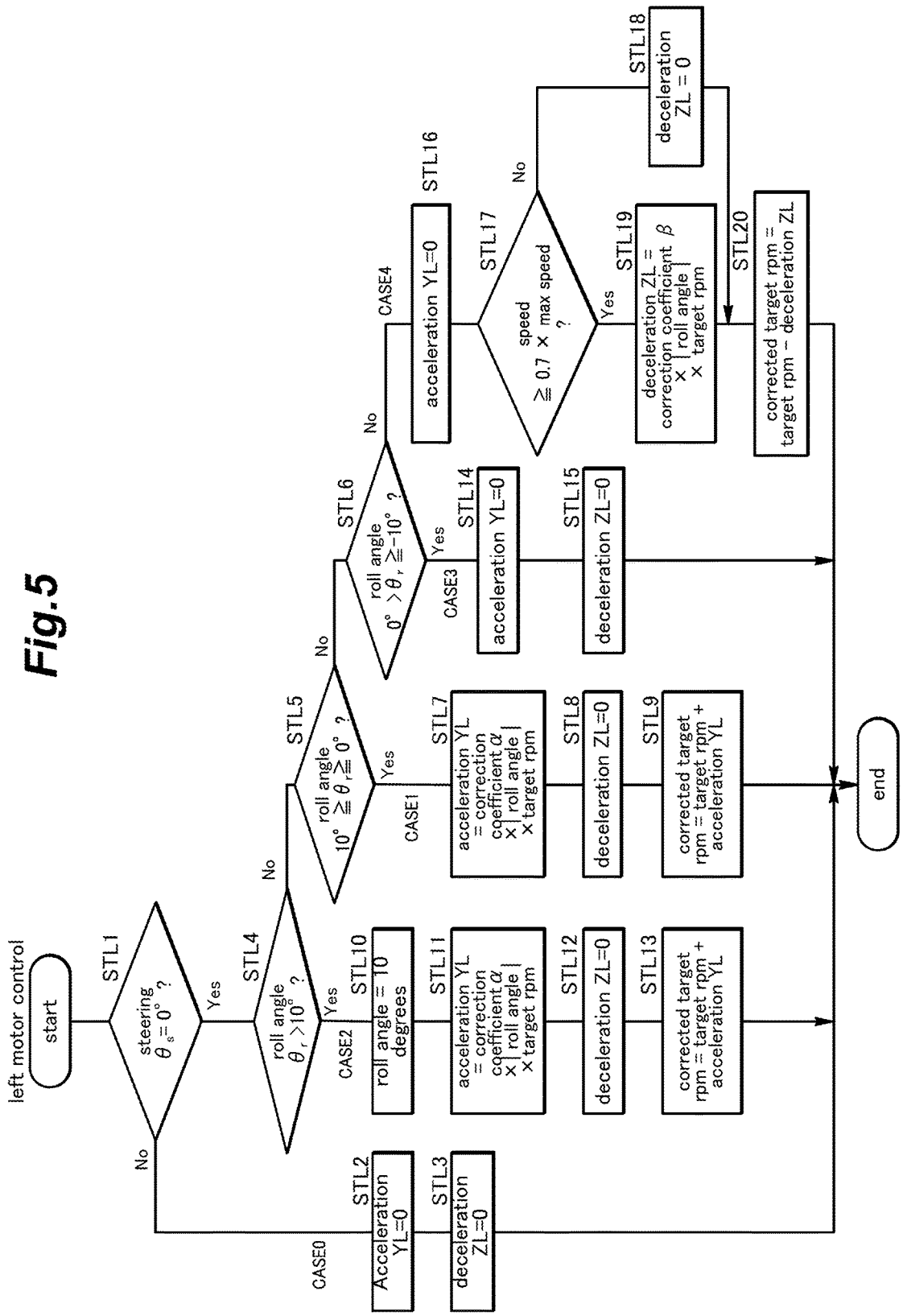
FIG. 5 is a flowchart of a control process for a left rear wheel.

The control process for the electric motors 12 performed by the control unit 1 is described in the following with reference to the block diagram of FIG. 4 and the flowchart of FIGS. 5 and 6. The flowchart of FIG. 5 shows the control process for the left rear wheel, and the flow chart of FIG. 6 shows the control process for the right rear wheel. The control processes for the two rear wheels are simultaneously performed as will be discussed hereinafter. The roll angle $\theta r$ is defined as positive when the front axle 16 is tilted relative to the vehicle body 3 so as to raise the right end thereof, and negative when the front axle 16 is tilted relative to the vehicle body 3 so as to raise the left end thereof (see FIG. 3).

First of all, the steering determination unit 32 of the output correction unit 30 determines if the operator is driving the mower 2 in a straight ahead direction or steering the mower 2 (STL1/STR1). The steering determination may be made based on if the steering angle θs is 0 or not. In the steering determination, a certain dead band may be defined around the zero steering angle in order to ensure a stable behavior of the control process.

(Case 0)

If the mower 2 is being steered, instead of traveling straight ahead (θs≠0), the roll angle determination unit 33 and the speed determination unit 34 of the output correction unit 30 do not perform any action, and the acceleration computing unit 35 and the deceleration computing unit 36 of the output correction unit 30 set the acceleration value Y and the deceleration value Z to 0 (STL2, STL3/STR2, STR3). The target rotational speed computing unit 37 thus sets the target rotational speed of the electric motor 12 as determined according to the depression stroke detected by the accelerator pedal sensor 27 without correcting the target rotational speed. The ECU 28 then drives the electric motors 12 at the target rotational speed.

If no steering action is detected (θs=0) or the operator intends to drive the mower 2 in a straight course, the roll angle determination unit 33 classifies control flow into four cases, CASE 1 to 4 (STL4 to STL6/STR4 to STR6).

(Case 1)

When the front axle 16 is tilted with the right end up by a roll angle equal to or less than a prescribed value (0≤θr 10 degrees, for instance), the output of the left electric motor 12L is increased so that the left rear wheel 8L accelerates. More specifically, the acceleration computing unit 35 computes a target rotational speed of the two motors 12 from the depression stroke detected by the accelerator pedal sensor 27, and then computes an acceleration value YL for the left electric motor 12L by multiplying a prescribed correction coefficient α and the absolute value of the roll angle θr to the target rotational speed (STL7). The correction coefficient α may be experimentally or empirically selected, and may be 0.1, for example. The deceleration computing unit 36 sets a deceleration value ZL for the left electric motor 12L to 0 (STL8). The target rotational speed computing unit 37 produces a corrected target rotational speed for the left electric motor 12L by adding the acceleration value YL to the target rotational speed (STL9). The ECU 28 causes the left electric motor 12L to drive the left rear wheel 8L at a speed corresponding to the corrected target rotational speed.

As for the right electric motor 12R, the acceleration computing unit 35 and the deceleration computing unit 36 set the acceleration value YR and the deceleration value ZR, respectively, to 0 (STR7, STR8), and the target rotational speed computing unit 37 sets the target rotational speed of the right electric motor 12R to the target rotational speed as computed from the depression stroke detected by the accelerator pedal sensor 27 without making any correction. The ECU 28 causes the right electric motor 12R to drive the right rear wheel 8R at a speed corresponding to the target rotational speed.

(Case 2)

When the front axle 16 is tilted with the right end up by a roll angle exceeding the prescribed angle (10 degrees <θr, for instance), the output of the left electric motor 12L is increased so that the left rear wheel 8L accelerates, and, depending on the travel speed of the mower 2, the output of the right electric motor 12R is decreased so that the right rear wheel 8R decelerates.

More specifically, the acceleration computing unit 35 regards the roll angle Or as a predetermined angle (10 degrees in the illustrated embodiment) (STL10), and computes the acceleration value YL for the left electric motor 12L by multiplying the correction coefficient α and the absolute value of the roll angle θr to the target rotational speed (STL11). In other words, when the roll angle θr exceeds 10 degrees, the acceleration value YL is maintained at the same value as when the roll angle θr is 10 degrees. The deceleration computing unit 36 sets the deceleration value ZL for the left electric motor 12L to 0 (STL12). The target rotational speed computing unit 37 corrects the target rotational speed of the left electric motor 12L by adding the acceleration value YL to the target rotational speed (STL13). The ECU 28 causes the left electric motor 12L to drive the left rear wheel 8L at a speed corresponding to the corrected target rotational speed.

As for the right electric motor 12R, the acceleration computing unit 35 sets the acceleration value YR to 0 (STR9). To determine how the deceleration value ZR of the right electric motor 12R should be decided by the deceleration computing unit 36, the speed determination unit 34 determines if the current rotational speed of the rear wheels 8 (or the front wheels 9) is equal to or higher than a prescribed value (70% of the maximum rotational speed, for instance) (STR10). The speed of the vehicle (which corresponds to the rotational speed of the electric motor) is detected by the vehicle speed sensor 26. When the rotational speed of the right electric motor 12R is lower than the prescribed value, the deceleration computing unit 36 sets the deceleration value ZR to zero (STR11). When the rotational speed of the right electric motor 12R is equal to or higher than the prescribed value, the deceleration computing unit 36 corrects the target rotational speed by multiplying a correction coefficient β and the absolute value of the roll angle θr to the target rotational speed (STR12). The correction coefficient β may be experimentally or empirically selected, and may be 0.2, for example. Alternatively, instead of multiplying the absolute value of the roll angle θr, an absolute value of the roll angle θr minus a prescribed positive value (10 degrees, for example) may be multiplied to the target rotational speed. The target rotational speed computing unit 37 corrects the target rotational speed of the right electric motor 12R by subtracting the deceleration value ZR from the target rotational speed (STR13). The ECU 28 causes the right electric motor 12R to drive the right rear wheel 8R at a speed corresponding to the corrected target rotational speed.

(Case 3)

When the front axle 16 is tilted with the left end up by a roll angle equal to or less than a prescribed value (−10 degrees θr<0, for instance), the output of the right electric motor 12R is increased so that the right rear wheel 8R accelerates. Case 3 is similar to Case 1 except for that the right and left are reversed.

More specifically, the acceleration computing unit 35 computes a target rotational speed of the two motors 12 from the depression stroke detected by the accelerator pedal sensor 27, and then computes an acceleration value YR for the right electric motor 12R by multiplying the prescribed correction coefficient α and the absolute value of the roll angle θr to the target rotational speed (STR14). The deceleration computing unit 36 sets a deceleration value ZR for the right electric motor 12R to 0 (STR15). The target rotational speed computing unit 37 produces a corrected target rotational speed for the right electric motor 12R by adding the acceleration value YR to the target rotational speed (STR16). The ECU 28 causes the right electric motor 12R to drive the right rear wheel 8R at a speed corresponding to the corrected target rotational speed.

As for the left electric motor 12L, the acceleration computing unit 35 and the deceleration computing unit 36 set the acceleration value YL and the deceleration value ZL, respectively, to 0 (STL14, STL15), and the target rotational speed computing unit 37 sets the target rotational speed of the left electric motor 12L to the target rotational speed as computed from the depression stroke detected by the accelerator pedal sensor 27 without making any correction. The ECU 28 causes the left electric motor 12L to drive the left rear wheel 8L at a speed corresponding to the target rotational speed. (Case 4)

When the front axle 16 is tilted with the left end up by a roll angle exceeding the prescribed angle ($\theta r < -10$ degrees, for instance), the output of the right electric motor 12R is increased so that the right rear wheel 8R accelerates, and, depending on the travel speed of the mower 2, the output of the left electric motor 12L is decreased so that the left rear wheel 8L decelerates. Case 4 is similar to Case 2 except for that the right and left are reversed.

More specifically, the acceleration computing unit 35 regards the roll angle $\theta r$ as a predetermined angle (−10 degrees in the illustrated embodiment) (STR17), and computes the acceleration value YR for the right electric motor 12R by multiplying the correction coefficient $\alpha$ and the absolute value of the roll angle $\theta r$ to the target rotational speed (STR18). In other words, when the roll angle $\theta r$ falls below −10 degrees, the acceleration value YR is maintained at the same value as when the roll angle $\theta r$ is −10 degrees. The deceleration computing unit 36 sets the deceleration value ZR for the right electric motor 12R to 0 (STR19). The target rotational speed computing unit 37 corrects the target rotational speed of the right electric motor 12R by adding the acceleration value YR to the target rotational speed (STR20). The ECU 28 causes the right electric motor 12R to drive the right rear wheel 8R at a speed corresponding to the corrected target rotational speed.

As for the left electric motor 12L, the acceleration computing unit 35 sets the acceleration value YL to 0 (STL16). To determine how the deceleration value ZL of the left electric motor 12L should be decided by the deceleration computing unit 36, the speed determination unit 34 determines if the current rotational speed of the rear wheels 8 (or the front wheels 9) is equal to or higher than s prescribed value (which may be equal to the prescribed value of Case 2, or 70% of the maximum rotational speed, for instance) (STL17). The speed of the vehicle (which corresponds to the rotational speed of the electric motor) is detected by the vehicle speed sensor 26. When the rotational speed of the left electric motor 12L is lower than the prescribed value, the deceleration computing unit 36 sets the deceleration value ZL to zero (STL18). When the rotational speed of the left electric motor 12L is equal to or higher than the prescribed value, the deceleration computing unit 36 corrects the target rotational speed by multiplying the correction coefficient $\beta$ and the absolute value of the roll angle $\theta r$ to the target rotational speed (STL19). Alternatively, instead of multiplying the absolute value of the roll angle $\theta r$, an absolute value of the roll angle $\theta r$ minus a prescribed positive value (10 degrees, for example) may be multiplied to the target rotational speed. The target rotational speed computing unit 37 corrects the target rotational speed of the left electric motor 12L by subtracting the deceleration value ZL from the target rotational speed (STL20). The ECU 28 causes the left electric motor 12L to drive the left rear wheel 8L at a speed corresponding to the corrected target rotational speed.

In the foregoing disclosure, for the sake of convenience, the case where the roll angle $\theta r$ is 0 degree was included in Case 1, but may also be included in Case 3 instead. Similarly, the roll angles $\theta r$ of 10 degrees and −10 degrees may be included in Case 2 and Case 4, respectively, instead in Case 1 and Case 3, respectively.

The mode of operation of the control unit 1 is described in the following with reference to FIG. 7.

When the steering angle $\theta s$ detected by the steering sensor 24 is 0 degree, and the roll angle $\theta r$ detected by the axle sensor 25 is also zero, as in the interval preceding interval A and the interval between interval A and interval B, the operator is driving the mower 2 in the straight ahead direction, and the mower does not encounter any irregularity on the ground surface. Therefore, the acceleration value Y and the deceleration value Z are both zero, and no correction is made for the target rotational speed of the motors 12 that drive the rear wheels 8.

The interval denoted by A in FIG. 7 corresponds to Case 1. At this time, the steering angle $\theta s$ detected by the steering sensor 24 is zero degree, and the roll angle $\theta r$ detected by the axle sensor 25 ranges from 0 degree to 10 degrees. In other words, although the operator intends to drive the mower 2 straight ahead, the front axle 16 tilts with the right end up with respect to the vehicle body 3 so that the camber angle of the front wheels 9 increases in a direction to steer the front wheels 9 to the left. The front axle 16 tilts in this manner when the right front wheel 9R or the left rear wheel 8L rides over a bump, or when the left front wheel 9L or the right rear wheel 8R drops into a dip. In this case, by accelerating the left rear wheel 8L, the steering action caused by the change in the camber angle is canceled so that the mower 2 is allowed to travel straight ahead without any intervention by the operator.

The interval indicated by B in FIG. 7 corresponds to Case 3, and the motion of the mower 2 is similar to that in interval A, but is reversed in regard to the right and the left. More specifically, the steering angle $\theta s$ detected by the steering sensor 24 is zero degree, and the roll angle $\theta r$ detected by the axle sensor 25 ranges from −10 degrees to 0 degree. In other words, although the operator intends to drive the mower 2 straight ahead, the front axle 16 tilts with the left end up with respect to the vehicle body 3 so that the camber angle of the front wheels 9 increases in a direction to steer the front wheels 9 to the right. The front axle 16 tilts in this manner when the left front wheel 9L or the right rear wheel 8R rides over a bump, or when the right front wheel 9R or the left rear wheel 8L drops into a dip. In this case, by accelerating the right rear wheel 8R, the steering action caused by the change in the camber angle is canceled so that the mower 2 is allowed to travel straight ahead without any intervention by the operator.

The interval indicated by C in FIG. 7 includes a part corresponding to Case 1, and a part corresponding to Case 2 when the travel speed of the mower 2 is less than 70% of the maximum speed of the mower 2. The roll angle $\theta r$ exceeds 10 degrees in a part of interval C, and the acceleration value YL during this part of interval C is a constant value which is equal to the acceleration value YL when the roll angle $\theta r$ is equal to 10 degrees. When the roll angle is relatively great, and the travel speed of the mower 2 is relatively low, the corrective action by the control unit 1 is limited so that an excessive acceleration of the left rear wheel 8L is avoided, and the stable motion of the mower 2 may be ensured. In this case, an intervention by the operator may be required to maintain the mower 2 to continue to travel straight ahead, but owing to the assistive action of the control unit 1, the operator can maintain the mower 2 in a straight course with less effort.

The interval indicated by D in FIG. 7 corresponds to Case 0. The steering angle θs detected by the steering sensor 24 is other than zero, and it means that the operator is intentionally steering the mower 2. Therefore, correction of the target rotational speed of either motor is not desirable in this condition. Therefore, even when the tilting of the front axle 16 is detected, the correction of the target rotational speed is not performed for either motor.

The intervals indicated by E1 and E2 in FIG. 7 include a part corresponding to Case 3, and a part corresponding to Case 4 when the travel speed of the mower 2 is 70% or more of the maximum vehicle speed. When the roll angle θr is greater than −10 degrees (−10 degrees<θr<0), the acceleration value YR for the right electric motor increases in proportion to the increase in the absolute value of the roll angle θr. Once the roll angle θr falls below −10 degrees (θr<−10 degrees), the acceleration value YR for the right electric motor 12R is kept at a fixed value which is equal to the acceleration value YR when the roll angle θr is equal to −10 degrees while the left electric motor 12L is decelerated. When the tilt angle of the front axle 16 is great, and the travel speed of the mower 2 is high, one of the rear wheels 8 is accelerated while the other rear wheel 8 is decelerated so that the mower 2 is enabled to maintain a straight course, and an undesired increase in the travel speed of the mower 2 can be avoided.

Although the present invention has been described in terms of a preferred embodiment thereof, it is obvious to a person skilled in the art that various alterations and modifications are possible without departing from the scope of the present invention. For example, instead of increasing the correction coefficient for the target rotational speed of the rear wheel in proportion to the roll angle, the correction coefficient may be incrementally increased with an increase in the roll angle. Further, the rotational speed for determining if the deceleration value may be set or not may be detected from the vehicle speed sensor, instead of the depression stroke of the accelerator pedal. It is also possible to drive the front wheels, and support the front wheels with a rigid front axle while the rear wheels are non-driven wheels which are supported by a center pivot rear axle.

As long as the right and left rear wheels can be individually driven, the rear wheels may be driven by an internal combustion engine, instead of electric motors. The mowing unit may also be driven by an electric motor, instead of the internal combustion engine. The work unit is not limited to a mower unit, but may also consist of a tiller unit, a snow blowing unit, and other forms of work units which are configured to be operated while the power equipment travels at a prescribed speed. Even though the power equipment consisted of a riding mower in the foregoing embodiment, the power equipment may also be remote controlled by an operator positioned remotely from the power equipment, or the power equipment may consist of an autonomous power equipment.

The invention claimed is:

1. Power equipment, comprising:
   a vehicle body;
   a first axle rigidly supported by the vehicle body and rotatably supporting a pair of driven wheels including a left driven wheel and a right driven wheel;
   a power source for individually driving the driven wheels;
   a second axle supported by the vehicle body via a center pivot and rotatably supporting a pair of non-driven wheels;
   a steering device for steering the non-driven wheels and/or the driven wheels;
   a steering sensor for detecting a steering input of the steering device;
   an axle sensor for detecting a roll angle of the second axle relative to the vehicle body; and
   a control unit for controlling rotational speeds of the driven wheels;
   wherein the control unit is configured, when substantially no steering input of the steering device is detected by the steering sensor, to accelerate the left driven wheel when a right end up roll angle of the second axle is detected by the axle sensor, and to accelerate the right driven wheel when a left end up roll angle of the second axle is detected by the axle sensor.

2. The power equipment according to claim 1, wherein the control unit is configured to accelerate one of the driven wheels by changing a target rotational speed of the one driven wheel and performing a feedback control to cause the one driven wheel to rotate at the target rotational speed.

3. The power equipment according to claim 1, wherein the control unit is configured to accelerate one of the driven wheels by an acceleration value which increases in proportion to an absolute value of the roll angle when the absolute value of the roll angle is equal to or smaller than a prescribed value, and is kept fixed at a value when the absolute value of the roll angle is greater than the prescribed value.

4. The power equipment according to claim 1, wherein the control unit is further provided with a speed sensor for detecting a travel speed of the power equipment, and is configured to, in addition to accelerating one of the driven wheels, decelerate the other driven wheel when the travel speed of the power equipment detected by the speed sensor exceeds a prescribed value.

5. The power equipment according to claim 1, wherein the first axle is a rear axle, and the second axle is a front axle.

* * * * *